MARTIN VAN BUREN SHAVER.
Glass for Lanterns and Lamps.

No. 125,849. Patented April 16, 1872.

No. 125,849

UNITED STATES PATENT OFFICE.

MARTIN VAN BUREN SHAVER, OF ADRIAN, MICHIGAN.

IMPROVEMENT IN GLASS FOR LANTERNS AND LAMPS.

Specification forming part of Letters Patent No. 125,849, dated April 16, 1872.

Be it known that I, MARTIN VAN BUREN SHAVER, of Adrian, county of Lenawee, State of Michigan, have invented a new and Improved Glass for Lanterns and Lamps; and I declare the following to be a full, clear, and exact description of the same, such as will enable others skilled in the art to which it pertains to make and use it, reference being had to the accompanying drawing forming a part of this specification.

My invention relates to the form of the glass taken in connection with the relative position of the flame of the lamp. My invention consists in making the glass so that it will appear like two frustums of cones—one right and the other inverted—with a common axis, these two cones intersecting at their smallest common circle, midway between the top and bottom of the lantern-glass. The bottom cone rests on its base, with its apex upward, and terminates at the circle of intersection, as does also the upper cone. I propose to place the lamp in such a position that the flame from its wick will be partly below and partly above the circle of intersection, so that the draught caused to come in at the bottom and carried up through the top of the lantern by the influence of the heat from the burning wick, will, in coming through the contracted opening around the flame, prevent it from flickering, and keep the flame from meeting the glass. I propose, also, at this contracted circle of intersection, sometimes to make a flange to project from this circle on the inside, beyond the general surface of the glass, for the purpose of making this opening still more contracted, thereby furnishing a greater draught of air, and consequently a greater supply of oxygen to the flame, causing a more perfect combustion of the carbon in the oil, and, as a result, a brighter light and little if any smoke. The glass at the intersection of the cones is somewhat thicker than at the top and bottom. In case kerosene oil is burned, the rim or flange on the inside of the circle of intersection serves as a base upon which may rest a common lamp-chimney. The cross-section of this lantern-glass or globe by any horizontal plane is a circle. I propose to attach this glass or globe to any of the ordinary lantern-frames.

Figure 1:
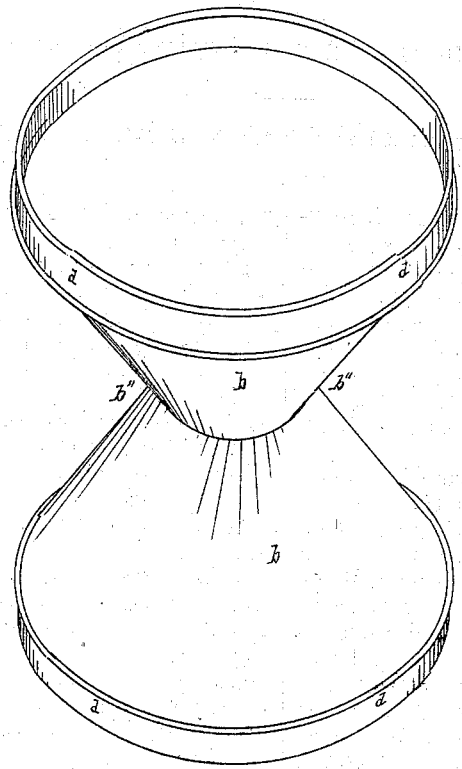
Figure 2:
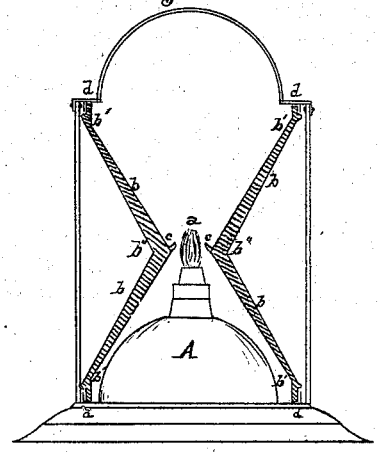

In the drawing, Figure 1 shows the shape of the lantern-globe reduced in size at $b'' b''$. Fig. 2 shows a section by a vertical plane containing the axis of the cones, in which A is the lamp; $a$, its flame. $b b$ is the glass made thin at $b' b'$ and thick at $b'' b''$. $c$ is the rim or flange for retaining a lamp-chimney. $d d$ are the shapes (which may be varied) given to the two ends to facilitate attachment to a lantern-frame.

Having thus described my invention, what I claim as new, and desire to secure by Letters Patent, is—

The lantern-globe $b b$, reduced in diameter at $b'' b''$, and provided with rim $c$, all constructed in the manner and operating substantially as shown and described.

MARTIN VAN BUREN SHAVER.

Witnesses:
T. M. BREVAL,
RICHARD W. MAHER.